Dec. 3, 1957  A. C. RUGE  2,815,480
PARALLEL OPERATION OF MULTIPLE POTENTIOMETER NETWORKS
Filed July 2, 1953  2 Sheets-Sheet 2
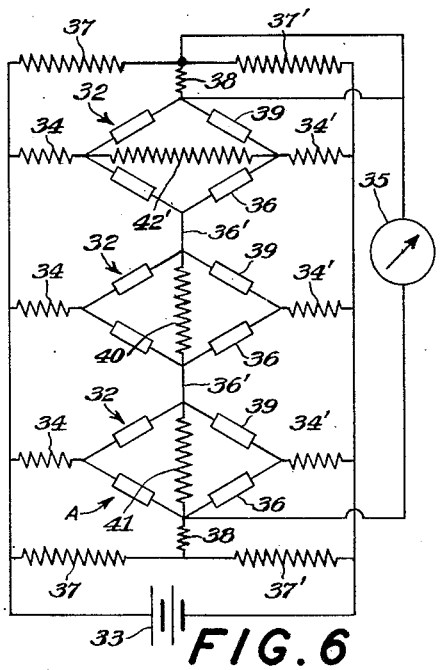
FIG. 6
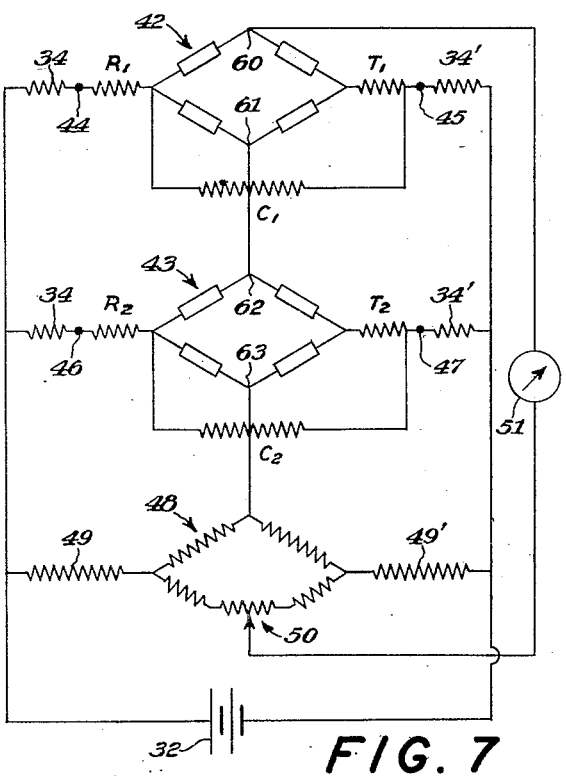
FIG. 7
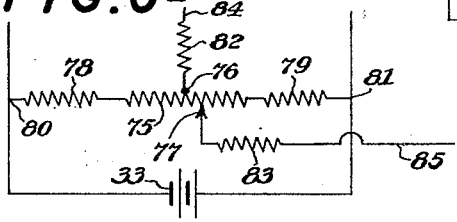
FIG. 6a
FIG. 9
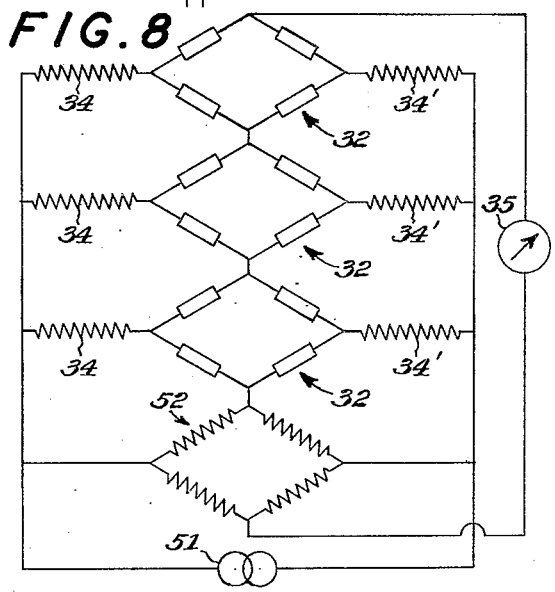
FIG. 8
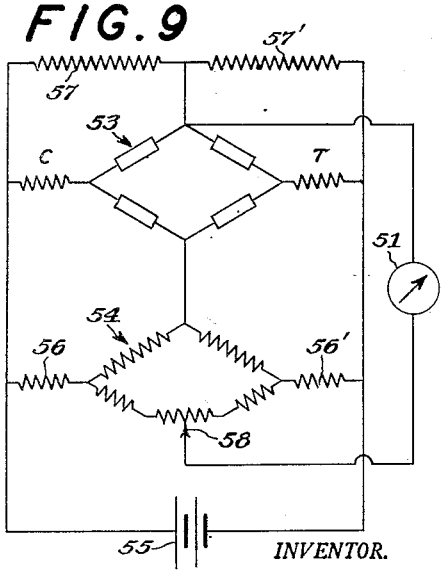
INVENTOR.
ARTHUR C. RUGE
BY
ATTORNEY United States Patent Office 2,815,480
Patented Dec. 3, 1957

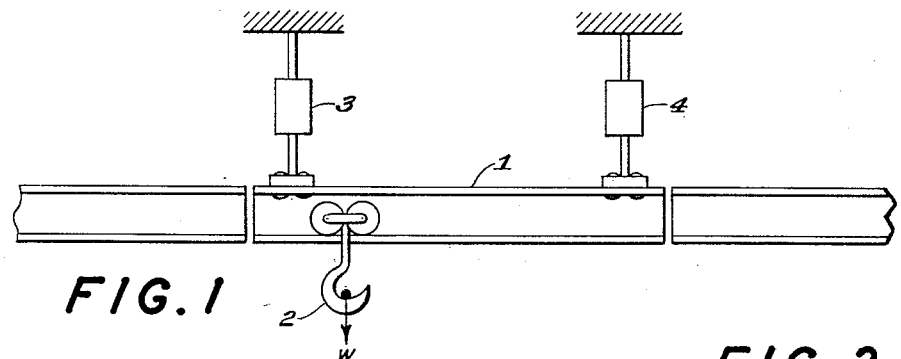
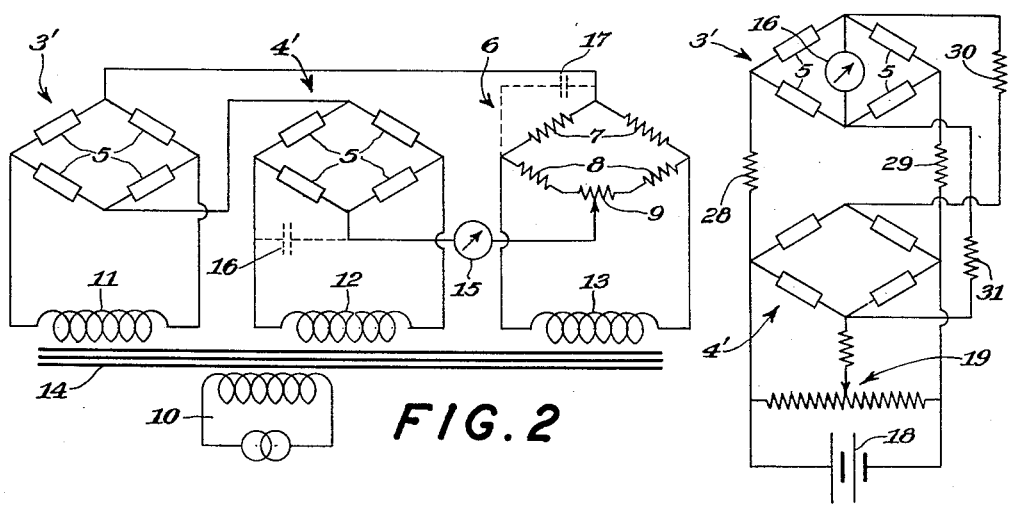
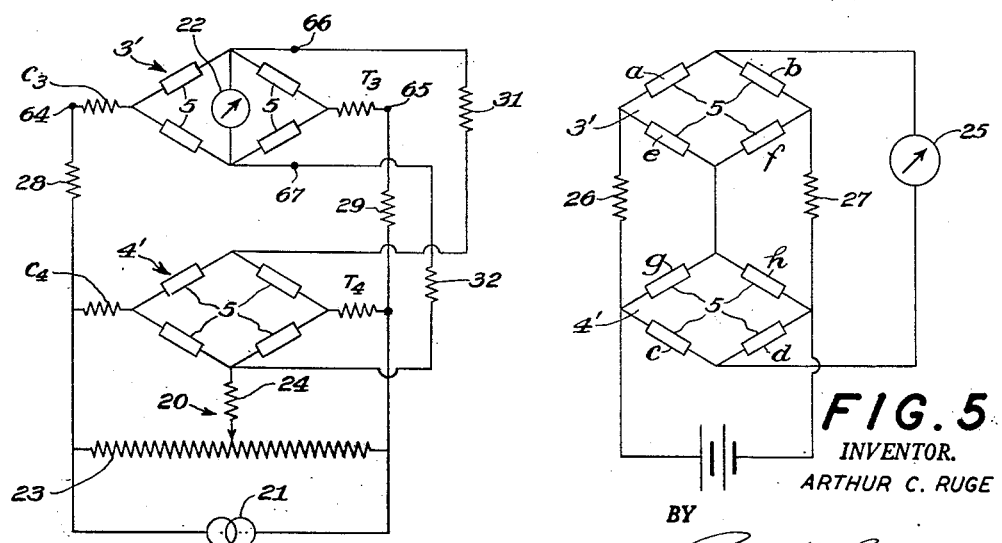

2,815,480

PARALLEL OPERATION OF MULTIPLE POTENTIOMETER NETWORKS

Arthur C. Ruge, Cambridge, Mass., assignor to Baldwin-Lima-Hamilton Corporation, a corporation of Pennsylvania Application July 2, 1953, Serial No. 365,686

25 Claims. (Cl. 323—75)

This invention relates to parallel operation of multiple bridge and multiple potentiometer networks useful in connection with the measuring of various conditions such, for example, as dynamometer forces, loads in weighing scales, temperatures, pressures, electrical resistances, etc.

It is one object of my invention to provide improved means for adding, averaging, or opposing the outputs of a multiplicity of impedance bridge networks, potentiometer networks, or a combination thereof.

A further object is to provide an improved circuit for accomplishing the foregoing object by utilizing a single source of power which may be either alternating or direct current.

Other objects and advantages will be more apparent to those skilled in the art from the following description of the accompanying drawings in which:

Fig. 1 is a diagrammatic arrangement of a weighing system showing a load to be measured;

Fig. 2 is a conventional multiple bridge circuit by which the load of Fig. 1 can be measured;

Fig. 3 is an idealized embodiment of the principles of my invention showing parallel operation of two bridge circuits connected in parallel;

Fig. 4 shows how the principles of the idealized embodiment of Fig. 3 are applied to a practical resistance wire strain gage load cell circuit;

Fig. 5 is a modification of my invention showing two bridges connected with the power input terminals in parallel and the output terminals in series; and Figs. 6 to 9 inclusive, are further modifications of the principles of my invention.

The objects and the features of my present invention will be more readily understood by first understanding the problem of multiple bridge circuit operation and the limitations of presently used circuits employing multiple bridges. For the purpose of explaining the invention and its relation to the prior art, the invention will be considered specifically in connection with closed bridge networks such as are commonly used in electrical resistance strain gage bridges employed in such devices as load cells and fluid pressure cells such, for example, as those shown in my Patents 2,472,047 and 2,576,417, and in Simmons' Patent No. 2,365,015, although it will be clear that the principles of the invention are by no means limited to such devices but are equally applicable wherever it is necessary to add or average or oppose the outputs of a multiplicity of impedance bridge circuits and/or potentiometer networks.

As a specific example, the weighing system illustrated in Fig. 1 will be considered. It comprises an isolated section of a weighing scale of the type having a monorail 1 supported by electrically responsive strain gage load cells 3 and 4. Load W travels on carrier 2 which rides on monorail 1. The total load W is distributed between load cells 3 and 4 in varying proportion depending upon the position of carriage 2. The problem is to measure W directly by electrically combining the outputs of load cells 3 and 4.

Heretofore, this problem has been commonly solved in the manner shown in Fig. 2. Corresponding to load cells 3 and 4 of Fig. 1, I show in Fig. 2 bridge circuits 3' and 4' which are made up of resistance strain gages 5 comprising a bridge circuit of conventional type. Load cells 3 and 4 could for example be the force measuring dynamometer shown in my Patent No. 2,561,318 and strain gages 5 would be the gages 16, 17, 18, 19 shown in Fig. 3 of that patent, the bridge connections being so arranged that the bridge is responsive to axially applied load acting on the cell. For convenience in making the measurement of W, a third bridge 6 is shown comprising impedance elements 7 and 8 and a calibrated balancing slide wire 9. The three bridges are fed from a single A. C. primary source 10 through multiple windings 11, 12, 13 on transformer 14. Alternatively, independent D. C. voltages may be used to supply the several bridges, although the A. C. method is particularly advantageous because fluctuations in the source voltage 10 causes no relative upsets in the voltage acting on the several bridges. The outputs of bridges 3' and 4' are connected in series so that they are additive and the sum of these outputs is connected into the output of bridge 6 so that by adjustment of slide wire 9 the output of bridge 6 can be made to oppose and exactly equal the sum of the outputs of bridges 3' and 4' as indicated by null-indicating meter 15. Of course, this function is frequently performed by a servo-mechanism so that the weighing operation is entirely automatic.

Now it may be seen that if voltages 11 and 12 are properly selected relative to each other so that a given load applied to either cell 3 or 4 produces identical output of bridge 3' or 4', then the value of the weight W as determined by measuring bridge 6 will be perfectly independent of the position of carriage 2 on the monorail 1. That this same principle may be applied to an arbitrary number of load cells acting in a multiple cell weighing system is easily seen. Also, I have indicated only one means 9 of measuring the output of the multiple bridge circuit comprising 3' and 4' whereas many variations are obviously possible within the scope of my present invention.

One of the limitations of such a system as has been described and illustrated in Fig. 2 is that if the bridges are operated on A. C. as indicated in Fig. 2, the measuring problem is complicated by the effect of unbalanced capacities such as those indicated by dotted lines in Fig. 2. Such unbalanced capacities, or—in some cases—unbalanced inductances, render it difficult or impossible to obtain a true null-balance with indicator 15 even though artificial compensation is employed to offset the accidental unbalances. In addition, A. C. operated circuits are notoriously sensitive to stray pickup resulting from fields produced by external electrical devices such as transformers, motors, etc. When measurements of the highest precision are required it is invariably found that an A. C. operated system is ultimately limited by either residual quadrature unbalance as would be caused by capacitor 16, 17, or by stray pickup, both of which prevent the detecting device from seeing a perfectly "clean" signal. What is more important, the unbalanced quadrature voltages and the picked-up voltages do not normally remain constant and frequently vary with time and other factors through large ranges of magnitude.

Now it is quite obvious that voltages 11, 12 and 13 can be replaced by independent D. C. voltages, as has been stated above. This would enable us to operate the system entirely on D. C. and would avoid the primary objection to an A. C. system. On the other hand, there is a very serious limitation in such a D. C. operation as this. Aside from the fact that it would be necessary to have three (or in many cases more) separate D. C. batteries or power supplies, the problem of maintaining the exactly correct relative magnitudes of the D. C. voltage applied to the several bridges is difficult and expensive of solution. In the current art the bridge supply voltages have to be checked and adjusted as frequently as necessary to keep them within the required tolerances. If batteries are used they are bound to vary in voltage output with age of battery, temperature, and amount of loading, so they cannot be depended upon to maintain a given voltage over a reasonable period of time. If rectified A. C. power supplies are provided it is found that the voltages supplied to the bridges will vary with the same factors as in the case of batteries except that the age factor is less important. Some instrument builders supply automatic means for adjusting the voltages such as 11, 12, and 13 to the proper relative magnitudes, such adjustment taking place at predetermined intervals, normally fifteen-minute or half-hour intervals. In other cases, the operator has to perform a manual checking and adjusting operation to put the voltages in their proper relative magnitudes before attempting a precise weight determination. It is clear that such artifices impose serious limitations on the use of multiple bridge circuits with D. C. excitation. I shall now proceed to explain how my system avoids the difficulties of both the A. C. and D. C. circuits in a unique and efficient manner.

Still using the same example of Fig. 1 for purposes of illustration, I show in Fig. 3 one embodiment of the present invention in which I achieve parallel operation of bridges 3' and 4' in contrast to the isolated source arrangement of Fig. 2. Here I take two closed, that is, separate, bridge circuits 3' and 4', which may be remotely located relative to each other such as cells 3 and 4, Fig. 1, and tie the bridges in parallel, corner for corner. For purposes of illustration I show an unbalance detecting means 16 across the paralleled output corners of the two bridges. It will be seen that now I can operate the two bridges or a multiplicity of such bridges all fed from a single source 18 which may be either A. C. or D. C. If desired, unbalance indicator 16 can be a simple deflection type device or it can be used as a null-balance indicator and balance achieved by manipulating the balancing adjustment indicated generally at 19, the operation of which can, of course, be entirely automatic by means of servo-mechanism. It is seen that here I achieve the measurement of the weight W in Fig. 1 independent of position since the corner-for-corner parallel operation of the two bridges makes the output of the combination substantially independent of position of the carriage 2, so long as the bridges 3' and 4' have identical response to load when considered independently.

This "substantial" independence of position of load has to be qualified to the extent that the responsive changes taking place in the arms of bridges 3' and 4' must be small enough that their effects on the combined output can be superimposed linearly. That this is the case in a typical strain gage bridge is readily seen from the fact that the maximum change in any one bridge arm is normally less than ½ percent. To a high degree of accuracy, therefore, the combined output of the parallel connected network of Fig. 3 will be substantially the same whether the two load cells are equally loaded or only one is loaded and the other free of load.

In Fig. 4, I show how the embodiment illustrated in Fig. 3 is applied to a practical resistance wire strain gage load cell closed bridge network as distinguished from the idealized circuit of Fig. 3. Since it is expensive and difficult to make a multiplicity of load cells or similar devices all of which have absolutely identical output characteristics, strain gage bridges 3' and 4' are made alike to nominal shop tolerances both as to resistance and bridge output as a function of applied load. The output of such a network is conveniently expressed in terms of the ratio of the open circuit output voltage per unit of applied load, pressure, etc., to the voltage applied to the input terminals of the network, the result being a non-dimensional constant of the device. By "open circuit output" of a network is meant the voltage that would appear across the output terminals of the network if nothing were connected across them. From a knowledge of the open circuit output in any given network it is well known that one can readily calculate what the output will become when any given impedance is connected across the output terminals. In normal shop practice, there will be some variation in the resistance tolerance of the bridge arms and this can be kept small enough to be negligible for most practical measuring problems of the sort described here. The output constant of the device, however, will not be sufficiently near alike from one unit to the next and this is corrected for by "trimming" in the following manner.

First assume that $T_3 = T_4 = 0$ for simplicity. Fixed resistances $C_3$ and $C_4$ are inserted between one power terminal of the bridge circuits 3' and 4' respectively and one terminal of the power source 21, $C_3$ and $C_4$ being so selected that the output constants of the two bridges taken separately are identical within the tolerance required for the particular measuring application. This having been done, and the two closed bridges 3' and 4' being connected corner for corner in parallel fashion as shown in Fig. 4 so as to include the "calibration resistances" $C_3$ and $C_4$, the net result is to make the response of indicator 22 substantially independent of how the load W of Fig. 1 is distributed between the two cells 3 and 4. A simple balancing adjustment 20 is shown to indicate how the weight may be read directly on a calibrated slide wire which can be automatically operated by a null-detecting means 22 if desired. Many other types of balancing means may be applied within the spirit of this invention, as will be readily seen.

Where reference is made herein to a "closed bridge network," it is to be considered as including a closed bridge such as 3', Fig. 4, and having a pair of input terminals 64 and 65 and a pair of output terminals 66 and 67. An even broader term which I use to describe such a network as the closed bridge network first defined is "potentiometer network," the bridge 3' being regarded as a potentiometer and the potentiometer network having input terminals 64, 65 and output terminals 66, 67. As is more fully discussed in my copending application entitled "Remote Potentiometer Network Measuring System" filed herewith, such a bridge as 3' in Fig. 4 is in reality a double potentiometer and, in fact, is so referred to in the instrument trade, particularly when one or more of the output terminals is in the form of a sliding or adjustable contact.

To further explain the practical circuit that is used in wire strain gage devices, I shall now describe the action of resistors $T_3$ and $T_4$ in Fig. 4. In a strain gage device which depends upon the deformation of an elastic element to actuate the strain gages, it is necessary to compensate for the fact that the modulus of elasticity of the elastic material in general varies with temperature, where results of high accuracy are required over a wide range of temperatures. For most practical materials such as steel, dural beryllium copper, etc., the modulus of elasticity decreases with increasing temperature, with the result that the output constant of the device would increase with increasing temperature if no compensation were provided.

The customary way to provide for this effect is by means of "modulus compensators" $T_3$ and $T_4$ which are temperature-sensitive resistance elements maintained at substantially the same temperature as the device in question and having a positive temperature coefficient of resistance. Normally, for substantially identical devices the practice is to make $T_3$ equal $T_4$, although for very fine work there may be small differences depending upon the individual device's characteristics. It will be seen that if the temperature of the load cells 3 and 4 increases there will be less voltage appearing across the terminals of bridges 3′ and 4′ and hence their outputs will be proportionately decreased. Therefore, by proper choice of the modulus compensators $T_3$ and $T_4$ it is possible to substantially eliminate any effect of temperature in the response of the system.

In the particular balancing adjustment indicated generally at 20, the effect of temperature on the modulus resistors would cause a certain amount of change of the zero balance of the system which in some cases is undesirable. This can be overcome in either of two ways: (1) the modulus resistors $T_3$ and $T_4$ can be split into two equal parts and symmetrically located with respect to the bridges 3′ and 4′; or (2) if there are an even number of bridges the calibration and modulus resistors can be alternately reversed—in Fig. 4, for instance, the result is achieved by merely interchanging $C_4$ and $T_4$.

Since the circuit of Fig. 4 superficially resembles some further improved circuits to be described later, a few numerical values are given to fix the relative magnitudes of the component parts. In a typical load cell of the strain gage type, strain gages 5 might be 120 ohms resistance, modulus resistors $T_3$ and $T_4$ may be about 10 ohms of nickel or copper wire while calibration resistors $C_3$ and $C_4$ may lie between 0 and 10 ohms. Calibrated slide wire 23 might be 100 ohms, while resistor 24 might be 10,000 ohms or more. The important point to note is that the total resistance of the side resistors $C_3$, and $T_3$, etc., are in general smaller than the terminal resistance of bridges 3′ and 4′.

It will be seen that I have here provided means for parallel operation of multiple closed bridge networks in which the output of the combination is substantially proportional to the sum of the unbalances of the individual bridges, regardless of how this sum is distributed among the several bridges. The action of Fig. 4 is in reality an averaging one and not a true summing action such as that illustrated in Fig. 2. For this reason I refer to the combined output as being "proportional to the sum."

Lest it be thought that a circuit such as Fig. 3 or Fig. 4 can be rearranged so as to simply sum the outputs in series, reference is made to Fig. 5 which shows the two bridges connected with the power input terminals in parallel and the output terminals in series. At first glance, it might appear that this would result in an indication at indicator 25 of the true sum of the unbalances of the two bridges 3′ and 4′. This is not the case and it is a common fallacy which has frequently led the would-be user to disastrous results. A little consideration of Fig. 5 will show that, so far as indicator 25 is concerned, all it can "see" is a bridge comprising arms $a$, $b$, $c$ and $d$, its response being entirely independent of what is happening in arms $e$, $f$, $g$, $h$. Therefore, while the circuit will respond to the average, or sum, of changes in arms $a$, $b$, $c$, and $d$, it cannot give an average of the response of all of the arms. Furthermore, if there is any appreciable resistance due to contacts or lead wire resistance at points 26 and 27 this resistance is directly inside the effective bridge $a$, $b$, $c$, $d$, and any variation due to temperature or variable contact resistance will show up as a large change in the unbalance of the effective bridge $a$, $b$, $c$, $d$.

Reference to Figs. 3 and 4 will show that the introduction of comparable contact or lead wire resistances at points 28, 29, 30, 31 produces a very greatly attenuated effect on the output of the combination. This is brought about by the fact that in my circuit I take two closed bridge networks and connect them corner for corner with the result that any reasonable contact or lead wire resistances in the connections are external of the closed bridge networks as seen by the indicating or measuring system. I have demonstrated by actual test that the improvement so obtained amounts to several hundred to one with the use of the embodiments shown in Figs. 3 and 4 as compared with the arrangement shown in Fig. 5. In addition, the embodiment shown in Figs. 3 and 4 takes into account the true sum (in the form of an average) of all of the arms of all of the bridges so connected whereas Fig. 5 does not, as has been explained.

I now proceed to disclose further modifications of my present invention involving parallel operation of multiple potentiometer networks in which I supply all of the networks in parallel from a single voltage source through continuous conducting paths and connect the network outputs in series through continuous conducting paths to form a single output of the combination which is substantially proportional to the true algebraic sum of the outputs the networks would have if taken individually when not so connected through continuous conducting paths; that is, I achieve the summing effect of the circuit of Fig. 2 but with the marked difference that I do not require isolated voltage supplies for each of the bridges. By "continuous conducting paths" I mean that they will carry either D. C. or A. C. currents. This is in distinction to the circuit of Fig. 2 in which the single source of power 10 is not supplied to the several bridges 3′, 4′, 6 by continuous conducting paths but the paths are interrupted by a transformer so that both D. C. and A. C. current cannot flow through them. It will be seen that this modification of my invention combines the advantages of the Fig. 3 circuit with those of the Fig. 2 circuit, enabling me to use a single D. C. source to supply a multiplicity of bridges the outputs of which are additive so as to give a maximum output to the combination. In Fig. 6, I show a multiplicity of bridges 32 the outputs of which are to be added electrically. The bridges are all energized from a single source 33 (which may be D. C. or A. C.) through isolating resistors 34, 34′ which together are large relative to the terminal resistance of bridges 32. The output terminals of bridges 32 are connected in series to operate unbalance sensing device 35. The magnitude of resistors 34, 34′, relative to bridges 32 is determined by the degree of isolation between networks required in the summing function. Preferably, there will be from several times to perhaps one hundred times the resistance of bridge 32 so as to minimize interaction between the bridges but they may together comprise merely the larger part of the input terminal resistance and still be quite effective.

I will now consider what happens when any one bridge arm such as 36 varies as a result of functioning of the device which may be a load cell. The change that takes place in arm 36 will be only slightly modified by the presence of the connections between the bridges because of the presence of isolating resistances 34, 34′. Resistances 34, 34′ combined with the remainder of the circuit of Fig. 6 do exercise a shunting action on arm 36, but since these resistors are preferably made large relative to arm 36 this shunting action is small. This beneficial result can be further enhanced by the insertion of substantial resistances at 36′ provided that the impedance and sensitivity of detecting means 35 will tolerate the additional resistance as seen from its terminals.

An attempt to calculate the currents flowing in the various branches of the network shown in Fig. 6 will demonstrate that the unbalance of any one bridge produces a very complex current flow pattern as a result of the interconnections between the bridges in this embodiment of my invention. Nevertheless, the fact is that when resistors 34 and 34′ are made large enough relative to bridge resistors 32, the open circuit voltage as seen from the terminals of 35 is substantifially equal to the sum of the open circuit voltages the bridges would produce if they were not interconnected through their output terminals.

Now, in contrast to the simpler arrangements of Figs. 3 and 4, the modification exemplified in Fig. 6 and certain other figures to follow is not subject to the same restrictions as to magnitude of change of the arms of the several responsive bridges or potentiometer networks. This is because the isolating resistors do, in fact, carry out the function for which I have named them; i. e., they tend to isolate the closed bridges and/or potentiometers from each other so that the superposition of their outputs is much more perfect than in the case of Figs. 3 and 4. Therefore it can be seen that by making isolating resistors 34, 34' large relative to the input resistances of bridges 32, I can tolerate large responsive changes in the bridge arms while still having the combined output substantially independent of how it is distributed among the several bridges. This has the added advantage that in this improved embodiment of the present invention I can deal with bridges and potentiometers which undergo large swings of output voltage and still obtain a combined output which is substantially proportional to the sum of their open circuit outputs and, by making the isolating resistors sufficiently large, I can make the combined output closely approach the true sum of the open circuit outputs. Thus, one or more of the bridges may be made to vary as much as 100 percent in one or more arms or I can employ a potentiometer of equally wide response, as will be further explained below.

Since a circuit of the type shown in Fig. 6 is lacking symmetry in a vertical direction with respect to the shunting effects acting on the several bridges, addition of suitable resistors 37, 37' (and 38 if desired) may be used, if desired, to provide shunting symmetry in the vertical direction of the figure. In this way, the shunting effect on an arm such as 39 can be made the same as the shunting effect on arm 36, thus further improving the accuracy with which the circuit will sum the outputs of the individual bridges.

It is to be noted that I can combine the embodiments of Figs. 3 and 6 where I have a large number of bridges and wish to keep the total output impedance down to a lower value than if all of the bridges have their outputs connected in series. Thus, bridges 32 in Fig. 6 could be two or more bridges paralleled as shown in Fig. 3, etc. While I show all the bridges 32 in Fig. 6 as identical, it is to be understood that they are not necessarily so. They can be made deliberately different where it is desired to perform an output summation involving a number of different bridges or bridges having different characteristics. Also, one of the bridges as A could just as well be a measuring bridge provided with means to vary its unbalance manually or automatically so as to oppose the voltages produced by the remaining bridges, indicator 35 serving as a null detector.

Thus, going back to the illustration of Fig. 1, the upper bridges in Fig. 6 would be the bridges of load cells 3 and 4, while the lower bridge could be a bridge like bridge 6 of Fig. 2 with the slide wire calibrated to read the weight W in pounds and with the balancer 9 of Fig. 2 operated by servo controlled by null detector 35 of Fig. 6. Side resistors 34 or 34' need not all be alike nor need 37 and 37' be alike—these are matters of circuit design and are amenable of direct calculation or they can be determined experimentally. Furthermore, if the outputs of the various bridge networks are not exactly what they should be, the effective outputs may be "trimmed" by suitable adjustment of the corresponding resistors 34 and 34'.

Another way of trimming the outputs is by connecting suitable shunts across the output terminals of the individual networks—this latter is a very convenient means of making final precise adjustments to such a circuit. Suppose the circuit has been built to practical tolerances and it is now desired to see that each bridge produces a specified effect on the output of the combination when actuated as by a specified load on a load cell bridge. If the upper two bridges in Fig. 6 represent load cell bridges from the construction of Fig. 1, and if the lower one of them proves to have too great an output, it can be made to exactly equal the upper bridge by connecting a suitable shunt 40 across its output terminals. Similarly, if bridge A is used as the measuring bridge it can be trimmed to read exactly to the proper scale by applying shunt 41 across its output terminals.

Still another means of trimming the several networks to the desired relative values is by placing shunts across their input terminals as indicated at 42' in Fig. 6. These various trimming adjustments are a specific part of my broad invention involving parallel operation of multiple bridge circuits. Obviously trimming resistors 40, 41 and 42' can be omitted under certain circumstances without interfering with the broad invention.

The use of a measuring bridge as has been described in connection with Fig. 6 (column 6, lines 56 to 72) is an example of what I have more broadly defined above as a "potentiometer network." Such potentiometer networks may be of many forms and broadly include the closed bridge networks described above and also single- and double-potentiometer networks of conventional forms. The essential common characteristics being an impedance network having input and output terminals, there being continuous electrical conducting paths between the output terminals and between the input terminals, the network producing an open circuit output voltage which is responsive to the product of the voltage applied across the input terminals and a function of a condition to be measured.

In my said copending application filed herewith, I have illustrated a variety of potentiometer networks in all figures except Fig. 1. Double potentiometer networks are illustrated at 20 in Fig. 3, and 63 in Fig. 5. Single potentiometer networks are illustrated in Figs. 2a, b, c, and the networks designated as "add steps" and "interpolating scale" in Fig. 4. For the sake of completeness in the present disclosure I show in Fig. 6a, a single potentiometer type of network, although it is to be understood that any of the potentiometer networks of my said copending application may be used equally well within the spirit of this present invention. The potentiometer network illustrated in Fig. 6a comprises potentiometer 75 having output terminals 76, 77 one or both of which may be adjustable, here shown as 76 fixed and 77 adjustable. Isolating resistors 78 and 79 are interposed between the power source 33 and the potentiometer 75 and together they are larger in resistance than the resistance of 75. The potentiometer network, as I define it, has input terminals 80, 81. It may be seen that such a network satisfies the criterion I have set up in that its open circuit output (between terminals 76 and 77) is responsive to the product of the voltage applied across its input terminals (80, 81) and a function of a condition to be measured. In this instance, the condition to be measured may be the position of sliding contact 77 or it could be a responsive change in resistances 78, 79 and/or 75. Further, the potentiometer network of Fig. 6a may include resistance elements such as 82, 83 and have output terminals 84, 85.

The essential equivalence of the potentiometer network of Fig. 6a, the double potentiometer network 48, 49, 49' of Fig. 7 and the closed bridge network 32, 34, 34' of Fig. 6 is readily apparent in the light of the above explanations. In performing their functions in the present inventions they can properly be regarded as identical and, in fact, the choice of one potentiometer network over another is frequently a matter of availability of components or convenience of the designer.

In order to make the disclosure of the subject matter of Fig. 6 more complete, I show in Fig. 7 how I apply the invention in the case of a practical strain gage load or pressure cell circuit in which the output is adjusted to a specified value and the modulus compensation is provided for. While the modulus compensation principle is essentially the same as that described in connection with Fig. 4, it can readily be seen that some modification is required in the case of the circuit of Fig. 6. This is because side resistors 34 and 34' in Fig. 6, being large relative to the bridge resistance 32, tend to regulate the current flowing through the bridge even though the terminal resistance of the bridge may vary through rather wide limits. In other words, in addition to acting as isolation resistances, 34 and 34' serve as ballast resistors which tend to steady the current flowing through the bridge. Therefore, if I connected such a circuit as bridge 3' of Fig. 4 with its side resistor $C_3$ and $T_3$ in place of a bridge 32 in Fig. 6, it will be seen that the modulus compensation of the load cell would no longer perform as intended. $C_3$ and $T_3$ being small and the changes in $T_3$ being small, they would be swamped by the ballast effect of resistors 34 and 34' and would have very little effect either in the calibration or modulus compensation of the cell.

To get around this I employ the circuit shown in Fig. 7 which shows how Fig. 6 would be modified to solve the measuring problem of Fig. 1 when dealing with practical strain gage load cells and where it is desired to have one of the bridges serve as the measuring bridge in a null-balancing system. The load cell closed bridge networks are generally indicated at 42 and 43 and include everything between input terminals 44—45, and 46—47 and which has output terminals 60, 61, 62 and 63. Isolating side resistors 34 and 34' are introduced between the load cell input terminals and the single source of power 32, as was done in Fig. 6. Measuring bridge 48 is similarly connected to power source 32 through side resistors 49, 49', all side resistors 34, 34', 49, 49', being large relative to their respective bridge terminal resistances so as to act as isolating resistances. Measuring bridge 48 is shown for purposes of illustration as having a slide wire balancing means 50 which is manually or automatically operated to keep balance indicator 51 in a state of balance.

Referring to bridge 42, it is seen that I employ three resistors for trimming and modulus compensating in this type of operation. Resistor $T_1$ is a temperature-sensitive resistor having a positive temperature coefficient of resistance. It is connected externally of the bridge in one of the input lead circuits. Shunting $T_1$ and bridge 42 taken in series is calibration resistor $C_1$ which performs the double function of permitting the modulus compensator $T_1$ to perform its task and at the same time makes possible the adjustment of the cell output to a desired value. The resistor $R_1$ is connected in series with the aforementioned combination so as to adjust the terminal resistance between terminals 44, 45 to a desired standardized value, thus making all of the cell circuits interchangeable. In a practical load cell circuit the portions might be as follows: the bridge arms of bridge 42 would be approximately 120 ohms resistance, $T_1$ would be approximately 20 ohms of nickel or copper wire, $C_1$ would be about 150 ohms, while $R_1$ might lie between 0 and 10 ohms.

With these proportions in mind it can be seen what happens when temperature changes the modulus of elasticity of the elastic sensing element of the load cell. Resistor $T_1$, which is about double what it was in the example given to illustrate Fig. 4, undergoes a correspondingly larger change of resistance with temperature, but the effect of this change is approximately equally divided between two halves, one running through the bridge 42, the other going through the shunting resistance $C_1$. Since side resistors 34, 34' are large they tend to produce a constant current through the load cell terminals 44—45 regardless of changes in $T_1$. The effect of a change of temperature on resistor T is to change the distribution of this substantially constant current so that as the load cell becomes warmer less of the total current flows through its bridge circuit 42 and therefore its output is lowered to compensate for the effect of temperature on the modulus of the load cell elastic material.

Since the use of these trimming resistances is not a part of my invention, I will not go farther than this description of function. Suffice to say that $R_1$, $T_1$, $C_1$ can be determined to work with a given bridge 42 and side resistors 34, 34' so as to effectively compensate for modulus effects and at the same time produce a standardized output and terminal resistance of the cell so that it can be interchanged with another cell without upsetting the accuracy of the circuit. The details of the network may vary greatly within the spirit of the present invention, as the example just given in Fig. 7 shows, so long as my criterion is met regarding the nature of the potentiometer network. It is seen that in all cases I employ for my potentiometer network broadly an impedance network having a pair of power input terminals and a pair of output terminals, there being a continuous electrical conducting path between the output terminals and a continuous electrical conducting path between the input terminals, the network being adapted to produce an open circuit output voltage proportional to the product of the input voltage and a function of some condition to be measured as part of a sum. The condition may be resistance, temperature, load, pressure, position, etc., etc.

Resistors $R_1$ and $R_2$ are not necessary unless interchangeability of cells is desired, since the relative outputs of the several networks can be adjusted by means of the three shunting methods described in connection with Fig. 6. For example, properly selected shunts across the output terminals of the networks will serve to provide the necessary adjustment; also, shunts across the terminal resistances of the load cells 44, 45, or across the input terminals of bridge 42 itself, or shunts paralleling resistors $C_1$ and $C_2$ will suffice to provide the desired adjustment of the bridges relative to each other. In addition, shunt circuits such as 37, 37', 38, shown in Fig. 6, may be applied to vary the relative outputs of the bridges. As explained earlier, the modulus resistors $T_1$ and $T_2$ of Fig. 7 can be split to provide symmetry about the gage bridges 42 and 43, and this is what would normally be done in such a circuit if practical to do so.

Fig. 8 shows a further modification of the embodiment disclosed in Fig. 6 in that a multiplicity of bridges 32 is fed by a single source 51 in parallel arrangement through isolating resistors 34 and 34' while an additional bridge 52 is also fed in parallel from the same power source 51 but does not have isolating resistors between its input terminals and the power source. The outputs of all of the bridges are connected in series, as in Fig. 6. Bridge 52 could, for example, be a measuring bridge used to measure the total output of the other bridges in the combination, or it may be simply another bridge whose output is to be added into the total.

Fig. 9 shows an embodiment of Fig. 8 in which a single strain gage bridge 53 provided with calibration resistors C and modulus resistor T according to the principles set forth in the discussion of Fig. 4 is operated in parallel with a measuring bridge 54 fed from the same power source 55 through isolating resistors 56, 56'. Since the strain gage bridge is here provided with a one-sided modulus resistor T, a change of temperature would result in a shift in the zero balance of the output of the two bridges taken together. To compensate for this, I apply two shunting resistors 57, 57' connected as shown, 57 being made substantially equal to the sum of resistor 56 plus one-half of the input terminal resistance of measuring bridge 54, while resistor 57' is made substantially equal to the sum of isolating resistor 56' plus one-half the input terminal resistance of measuring bridge 54. The result is that I achieve a symmetry in the shunting effects acting upon arms of bridge 53 so that the unbalance of bridge 53 is unchanged by a change in the magnitude of modulus resistor T.

With this arrangement I therefore achieve a high degree of balance stability despite changing temperature of resistor T, even though the entire modulus resistor is concentrated at one side of bridge 53. If, on the other hand, it is possible to split the modulus resistor, placing half on each side of bridge 53, then the resistance shown at T in Fig. 9 represents merely the accidental difference between the two split halves of the modulus resistor, and the shunting resistors 57 and 57′ are even more effective since they serve to compensate for a much smaller net effect. This, in fact, is the preferred form of this embodiment of my invention.

In all of the above disclosure I have used the words "add" and "average" in the broad sense of an algebraic operation rather than simple arithmetical adding and averaging. Thus, it is to be understood that I can choose the algebraic sign of any one of the bridge outputs which are to enter into the "addition" or "averaging" by choosing the order in which its output terminals are connected in series with the other bridges in the combination or by reversing its input terminal connections. To take a specific illustration, suppose in Fig. 7 that bridges 42 and 43 are identical in every respect and respond identically to load imposed upon the corresponding load cells. Then, their outputs will add when connected as shown in the figure. If bridge 48 is used as a measuring bridge in a null-balancing type of measurement, its output will be adjusted so as to be opposed or negative to the output produced by cells 42 and 43 taken together. If, on the other hand, I wish to measure only the differential in load between the two load cells, all I have to do is reverse the output terminal connections of either cell bridge 42 or bridge 43 so that they are opposed or negative to each other. The result will be that the measurement made by balancing adjustment 50 in measuring bridge 48 will be responsive only to the difference in load applied to the load cell bridges 42 and 43.

It will, of course, be understood that various changes in details of construction and arrangement of parts may be made by those skilled in the art without departing from the spirit of the invention as set forth in the appended claims.

I claim:

1. A parallel connected circuit comprising a plurality of separate potentiometer networks each having input and output terminals, a single source of power, a plurality of circuits each connecting said source of power in series with the input terminals of one of said separate potentiometer networks, means for connecting together the output terminals of said networks through continuous electrical conductors, whereby any resistance in the connections between said networks is external of said separate networks so as to effect a single output which is substantially proportional to the algebraic sum of the open circuit outputs of said networks, and means responsive to said single output.

2. The combination set forth in claim 1 further characterized in that the input terminals and source of power are directly connected together and the output terminals of the networks are connected together in parallel with said means responsive to said single output.

3. The combination set forth in claim 1 further characterized by the provision of means for varying the output of one of said networks so as to adjust said single output to a desired value.

4. The combination set forth in claim 1 further characterized by the provision of balancing means connected to said source of power through continuous electrical conductors and to at least one of said networks by continuous conductors, said balancing means being adapted to effect variation of said single output substantially independent of the effects produced by said networks.

5. The combination set forth in claim 1 further characterized in that one of said potentiometer networks includes a bridge circuit provided with adjustable potentiometer means for varying the unbalance of that bridge circuit so as to adjust said single output to a desired value.

6. The combination set forth in claim 1 further characterized in that one of said networks includes a potentiometer and isolating resistors connected in series with its input terminals and said source of power, the total electrical resistance of said isolating resistors being larger than the input resistance of said potentiometer to which the corresponding isolating resistors are connected.

7. The combination set forth in claim 1 further characterized in that there are several potentiometer networks, each including a potentiometer, a plurality of which networks are provided with isolating resistors connected in series with the electrical power conductor connected thereto, the total electrical resistance of said isolating resistors being larger than the input resistance of said potentiometers to which the corresponding isolating resistors are connected.

8. The combination set forth in claim 1 further characterized in that there are several potentiometer networks each including a potentiometer, one of which has its potentiometer input terminals connected directly to the electrical power conductors and the others have isolating resistors interposed between their potentiometers and the power conductors, the total electrical resistance of said isolating resistors being larger than the input resistance of said potentiometers to which the corresponding isolating resistors are connected.

9. The combination set forth in claim 1 further characterized in that all of the potentiometer networks include potentiometers and are provided with isolating resistors connected in series with the power conductors connected thereto, the total electrical resistance of said isolating resistors being larger than the input resistance of said potentiometers to which the corresponding isolating resistors are connected.

10. The combination set forth in claim 1 further characterized in that one of said networks includes a potentiometer and isolating resistors connected in series with its input terminals and said source of power, the total electrical resistance of said isolating resistors being larger than the input resistance of said potentiometer to which the corresponding isolating resistors are connected, and further characterized by the provision of a shunting resistance connected across the power terminals of said potentiometer to which the isolating resistors are connected, thereby to adjust the output of said potentiometer network relative to the others.

11. The combination set forth in claim 1 further characterized by the provision of a shunting resistance connected across the output terminals of one of said potentiometer networks so as to adjust its output relative to the others.

12. The combination set forth in claim 1 further characterized by the inclusion of isolating resistors connected in series with the input terminals and the electrical conductors leading from the power source to those terminals, the total electrical resistance of said isolating resistors comprising the larger part of the resistance between the input terminals of the corresponding potentiometer network in which the corresponding isolating resistors are included, with the further provision of two shunting resistances having a common terminal which is connected to said continuous conductor joining the output terminals of the bridges, the other terminals of the shunting resistances being connected directly across said single source of power, thereby to adjust the outputs of the bridges relative to each other.

13. The combination set forth in claim 1 further characterized by the inclusion of isolating resistors connected in series with the input terminals and the electrical conductors leading from the power source to those terminals, the total electrical resistance of said isolating resistors comprising the larger part of the resistance between the input terminals of the potentiometer network in which the corresponding isolating resistors are included, with the further provision of additional isolating resistors which are included in the continuous conductor joining the output terminals of the networks.

14. The combination set forth in claim 1 further characterized in that there are several potentiometer networks one of which has its input terminals connected to the electrical power conductors and which includes a resistance element connected in series with said last mentioned input terminals and its power conductor, said element comprising the smaller part of the resistance between the input terminals of that network, and the other networks including isolating resistors connected in series with their input terminals and the power conductors, the total electrical resistance of said isolating resistors comprising the larger part of resistance between the input terminals of the network in which the corresponding isolating resistors are included.

15. The combination set forth in claim 1 further characterized in that there are several potentiometer networks one of which has its input terminals connected to the electrical power conductors and which includes a resistance element connected in series with said last mentioned input terminals and its power conductor, said element comprising the smaller part of the resistance between the input terminals of that network, and the other networks including isolating resistors connected in series with their input terminals and the power conductors, the total electrical resistance of said isolating resistors comprising the larger part of the resistance between the input terminals of the network in which the corresponding isolating resistors are included, at least a part of said resistance element being responsive to temperature, two shunting resistances having a common terminal connected to the common junction between one of the terminals of said single combined output and one of the output terminals of said network whose input terminal is connected to the power conductor through said resistance element, the other ends of said shunting resistances being connected across said power supply, the magnitude of said shunting resistance being so chosen that said single combined output is substantially free from drift due to the effect of temperature on said temperature responsive resistance.

16. The combination set forth in claim 1 further characterized in that each of said potentiometer networks has a continuous electrical connecting path between its output terminals and a continuous electrical conducting path between its input terminals, said network being adapted to produce an open circuit output voltage which is responsive to the product of the voltage applied across its input terminals and a function of a condition to be measured as part of a sum.

17. The combination set forth in claim 1 further characterized in that one of said separate potentiometer networks includes a potentiometer having two output contacts independent of each other at least one of which is adjustable, said two output contacts comprising the output terminals of said potentiometer network, thereby to effect an open circuit output voltage of the potentiometer network which is responsive to the product of the voltage applied across its input terminals and a function of the position of said adjustable contact.

18. A measuring circuit comprising at least one first potentiometer network and at least one second potentiometer network, each of said networks having two input and two output terminals, a single source of power for energizing both of said networks in parallel through their input terminals, means for connecting together the output terminals of said networks through continuous electrical conductors, whereby any resistance in the connections between said networks is external of their terminals so as to effect a single output which is substantialy proportional to the algebraic sum of the open circuit outputs of said networks, and means responsive to said single output.

19. The combination set forth in claim 1 further characterized in that one of the separate potentiometer networks includes a closed bridge circuit having two input and two output terminals, said two input terminals being connected in series with the input terminals of the potentiometer network of which it is a part, said two output terminals being connected in series with the output terminals of the potentiometer network of which it is a part, the output of said closed bridge circuit being responsive to the product of the voltage applied across its said two input terminals and a function of a condition to be measured as part of the algebraic sum of the open circuit outputs of said plurality of separate potentiometer networks.

20. The combination set forth in claim 1 further characterized in that one of said potentiometer networks includes a resistance element connected in series with its input terminals and its power conductors, at least a part of said resistance element being responsive to temperature, all of said plurality of separate networks being energized in parallel by said single source of power through direct connections, and the corresponding output terminals of said networks being connected together point for point through their conductors, thereby to cause said single output to be substantially equal to the algebraic average value of the open circuit outputs of said networks.

21. The combination set forth in claim 1 further characterized in that said single source of power has at least a component of direct current.

22. The combination set forth in claim 1 further characterized in that said source of power has at least a component of alternating current.

23. The combination set forth in claim 1 further characterized in that there are several potentiometer networks one of which has its input terminals connected to the electrical power conductors and which includes a resistance element connected in series with said last mentioned input terminals and its power conductor, said element comprising the smaller part of the resistance between the input terminals of that network and having at least part of its resistance responsive to temperature, and the other said separate networks including resistors connected in series with their input terminals and the power conductors, the total electrical resistance of said isolating resistors comprising the larger part of resistance between the input terminals of the network in which the corresponding isolating resistors are included.

24. A measuring circuit comprising at least one first potentiometer network and at least one second potentiometer network, each of said networks having two input and two output terminals, a single source of power for energizing both of said networks in parallel through their input terminals, said first potentiometer network including a potentiometer and isolating resistors connected in series with its input terminals and said source of power, means for connecting together the output terminals of said networks through continuous electrical conductors whereby any resistance in the connection between said networks is external of their terminals, said isolating resistors taken together comprising at least three-fourths of the input resistance of said first potentiometer network thereby to effect a single output which is substantially equal to the algebraic sum of the open circuit outputs of said networks, and means responsive to said single otutput.

25. The combination set forth in claim 18 further characterized in that said first potentiometer network includes a potentiometer and at least two isolating resistors connected in series with its input terminals and said source of power, said potentiometer being interposed between said two isolating resistors, the total electrical resistance of said two isolating resistors being larger than the input resistance of said potentiometer to which the corresponding isolating resistors are connected.

References Cited in the file of this patent

UNITED STATES PATENTS

| | | |
|---|---|---|
| 2,393,669 | Wheaton et al. | Jan. 29, 1946 |
| 2,478,720 | Sourwine | Aug. 9, 1949 |
| 2,597,751 | Ruge | May 20, 1952 |
| 2,630,007 | Howe et al. | Mar. 3, 1953 |